(12) United States Patent
Liang et al.

(10) Patent No.: US 6,871,490 B2
(45) Date of Patent: Mar. 29, 2005

(54) EMISSIONS CONTROL SYSTEM FOR INCREASING SELECTIVE CATALYTIC REDUCTION EFFICIENCY

(75) Inventors: Cho Y. Liang, West Lafayette, IN (US); Steven R. McCoy, Washington, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/325,613

(22) Filed: Dec. 19, 2002

(65) Prior Publication Data

US 2004/0118106 A1 Jun. 24, 2004

(51) Int. Cl.[7] ................................................. F02N 3/00
(52) U.S. Cl. ............................. 60/286; 60/278; 60/288; 60/301; 60/287
(58) Field of Search ....................... 60/274, 278, 286, 60/295, 301, 287, 288

(56) References Cited

U.S. PATENT DOCUMENTS

| | | | | |
|---|---|---|---|---|
| 5,643,536 A | * | 7/1997 | Schmelz | .................... 422/105 |
| 6,209,317 B1 | * | 4/2001 | Hirota | ........................ 60/297 |
| 6,427,439 B1 | * | 8/2002 | Xu et al. | ..................... 60/286 |
| 6,446,430 B1 | * | 9/2002 | Roth et al. | .................... 60/286 |
| 6,502,391 B1 | * | 1/2003 | Hirota et al. | ................. 60/288 |
| 6,615,580 B1 | * | 9/2003 | Khair et al. | .................. 60/286 |

* cited by examiner

*Primary Examiner*—Thomas Denion
*Assistant Examiner*—Diem Tran
(74) *Attorney, Agent, or Firm*—Taylor & Aust

(57) ABSTRACT

An emissions control system is used with a compression ignition engine capable of producing an exhaust gas stream to be treated by a reduction agent which is mixed with the exhaust gas stream to convert the exhaust gas stream prior to being directed into an SCR catalyst capable of reducing NOx in the exhaust gas stream. An exhaust gas recirculation valve is associated with the compression ignition engine for directing the exhaust gas stream back into the compression ignition engine. An electronic control unit and sensors determine whether the temperature of the exhaust gas stream is at a predetermined temperature, and if so control operation of the valve to allow a portion of the exhaust gas stream to be directed into the SCR catalyst. A bypass valve may also be provided to prevent the exhaust gas stream from entering into the SCR catalyst.

13 Claims, 2 Drawing Sheets

EMISSIONS CONTROL SYSTEM FOR INCREASING SELECTIVE CATALYTIC REDUCTION EFFICIENCY

TECHNICAL FIELD

The present invention relates generally to emissions control systems for electronically controlled compression ignition engines, and more particularly to an emissions control system for increasing selective catalytic reduction (SCR) efficiency of a compression ignition engine.

BACKGROUND

Compression ignition engines, such as diesel engines, provide advantages in fuel economy, but produce and emit both NOx (nitrogen oxides) and particulates during normal operation. When primary measures (actions that affect the combustion process itself, e.g., exhaust gas recirculation and engine timing adjustments) are taken to reduce one, the other is usually increased. Thus, combustion conditions selected to reduce pollution from particulates and obtain good fuel economy tend to increase the output of NOx. Current and proposed regulations and legislation challenge manufacturers to achieve good fuel economy while at the same time require the reduction of the emissions of particulates and NOx.

In order to meet such requirements or restrictions a method known as SCR (selective catalytic reduction) has been used for reducing the emission of NOx. The SCR method consists of injecting gaseous ammonia NH3, ammonia in aqueous solution or aqueous urea, or ammonia supplied from an ammonia generator using a solid source of ammonia such as ammonia carbamate or ammonia carbanate, into the exhaust gas system of the compression ignition engine as a reduction agent. When the temperature of the exhaust gas stream is above a reaction temperature, for example a temperature above 160° C. for aqueous urea, the reduction agent undergoes a hydrolysis process and is decomposed into ammonia and CO2. As the exhaust gas stream is passed through the SCR catalyst the gaseous ammonia reacts with the NOx to reduce the NOx to molecular nitrogen. This reduces or limits the NOx emissions from the compression ignition engine.

Although an SCR catalyst system is effective in reducing NOx emissions above a certain exhaust gas temperature, it has been found that the effectiveness of the SCR catalyst is drastically reduced below this temperature due to several factors. One factor is that the rate of NOx conversion is strongly affected by the temperature of the exhaust gas. The NOx conversion efficiency drops off quickly when the exhaust gas temperature is below the temperature at which the conversion efficiency is 50%. This is known as the catalyst light-off temperature. Consequently, the SCR catalyst is not effective when the engine is operating under light load conditions.

When urea solution is used, another factor which reduces the effectiveness of the SCR catalyst system is the minimum hydrolysis temperature of the urea solution. Whenever a solution of urea is used to supply ammonia to the SCR catalyst, it is important that the temperature of the exhaust gas stream be at or above the minimum hydrolysis temperature, which is 160° C. Below its minimum hydrolysis temperature, the urea solution does not decompose into ammonia at a fast enough rage for a typical engine application. If the unhydrolyzed solution of urea is injected into the SCR catalyst, some of the urea is deposited on the surface of the SCR catalyst as a solid residue, which results in the system clogging or plugging. These conditions occur when an engine is operated under transient conditions, or under light load conditions, and NOx reduction by the SCR catalyst can not be achieved.

A third factor that reduces the efficiency of an SCR catalyst system is that the surface temperature of the catalyst must be at a minimum temperature. Until this temperature is obtained, the solution of urea should not be injected into the catalyst, and the delay in injecting the solution of urea causes the SCR catalyst system to lose efficiency. Low catalyst surface temperature can exist when the engine is coming out of a cold start condition or out of a prolonged period of light load operation.

One other factor that reduces the efficiency of the SCR catalyst system occurs when the engine is operating under a light load or an idle condition, and combustion takes place at low in-cylinder temperatures. Some of the unburned fuel and lube oil can survive the combustion process in the engine and be discharged into the exhaust gas stream as liquid droplets. Since the exhaust gas temperature is low, some of the liquid droplets are deposited on the surface of the SCR catalyst. A subsequent increase in exhaust temperature causes the liquid hydrocarbons to undergo partial oxidation. The residue formed can block the micro pores of the catalyst washcoat, causing the catalyst to reduce efficiency through loss of surface area within the catalyst. Increasing the combustion temperature is an effective way to reduce the amount of liquid hydrocarbons entering into the SCR catalyst.

In view of these factors which decrease the efficiency of the SCR catalyst, it would be advantageous to have a system that could insure that the temperature of the exhaust gas is at or above the minimum hydrolysis temperature for the solution of urea. It would also be desirable to have an emissions control system that ensures that the SCR catalyst does not become clogged with liquid hydrocarbons, or other matter that reduces the capability of the SCR catalyst to operate correctly or properly.

SUMMARY OF THE INVENTION

The present invention relates to an emissions control system for a compression ignition engine capable of producing an exhaust gas stream to be treated by a reduction agent which is mixed with the exhaust gas stream to convert the exhaust gas stream prior to being directed into an SCR catalyst capable of reducing NOx in the exhaust gas stream. The system comprises a sensor for determining the temperature of the exhaust gas stream prior to being mixed with the reduction agent, an exhaust gas recirculation valve associated with the compression ignition engine for directing the exhaust gas stream back into the compression ignition engine, and an electronic control unit connected to the sensor and the exhaust gas recirculation valve for determining whether the temperature of the exhaust gas stream is at a predetermined temperature and if so for controlling operation of the valve to allow a portion of the exhaust gas stream to be directed into the SCR catalyst.

Another aspect of the present invention relates to an emissions control system for a compression ignition engine capable of producing an exhaust gas stream to be treated by a reduction agent which is mixed with the exhaust gas stream to convert the exhaust gas stream prior to being directed into an SCR catalyst capable of reducing NOx emissions in the exhaust gas stream. The system comprises a sensor for determining the temperature of the exhaust gas stream prior to being mixed with the reduction agent, an exhaust gas recirculation valve associated with the compression ignition engine for directing the exhaust gas stream back into the compression ignition engine, a bypass valve associated with the exhaust gas stream and positioned prior to an input of the SCR catalyst, the bypass valve being operated to selectively and alternatively provide the exhaust gas stream to the input of the SCR catalyst or to bypass the SCR catalyst, and an electronic control unit connected to the temperature sensor, the exhaust gas recirculation valve, and the bypass valve for determining whether the temperature of the exhaust gas stream is at a predetermined temperature and if so for controlling operation of the exhaust gas recirculation valve to allow a portion of the exhaust gas stream to be directed to the bypass valve and for controlling operation of the bypass valve to either direct the exhaust gas stream which reaches the bypass valve selectively and alternatively into the SCR catalyst and to bypass the SCR catalyst.

Still another aspect of the invention provides a method for increasing the efficiency of an emissions control system for a compression ignition engine capable of producing an exhaust gas stream to be treated by a reduction agent which is mixed with the exhaust gas stream to convert the exhaust gas stream prior to being directed into an SCR catalyst capable of reducing NOx in the exhaust gas stream, the method providing the steps of determining the temperature of the exhaust gas stream prior to being mixed with the reduction agent; determining whether the temperature of the exhaust gas stream is at a predetermined temperature; and controlling the direction of flow of the exhaust gas stream based upon the temperature of the exhaust gas stream.

Other aspects and advantages of the present invention will be apparent to those skilled in the art upon reading the following detailed description in connection with the drawings and appended claims.

BRIEF DESCRIPTION OF THE DRAWINGS

The invention will be better understood and its advantages more apparent from the following detailed description, especially when read in light of the accompanying drawings, wherein.

DETAILED DESCRIPTION

Figure 1:
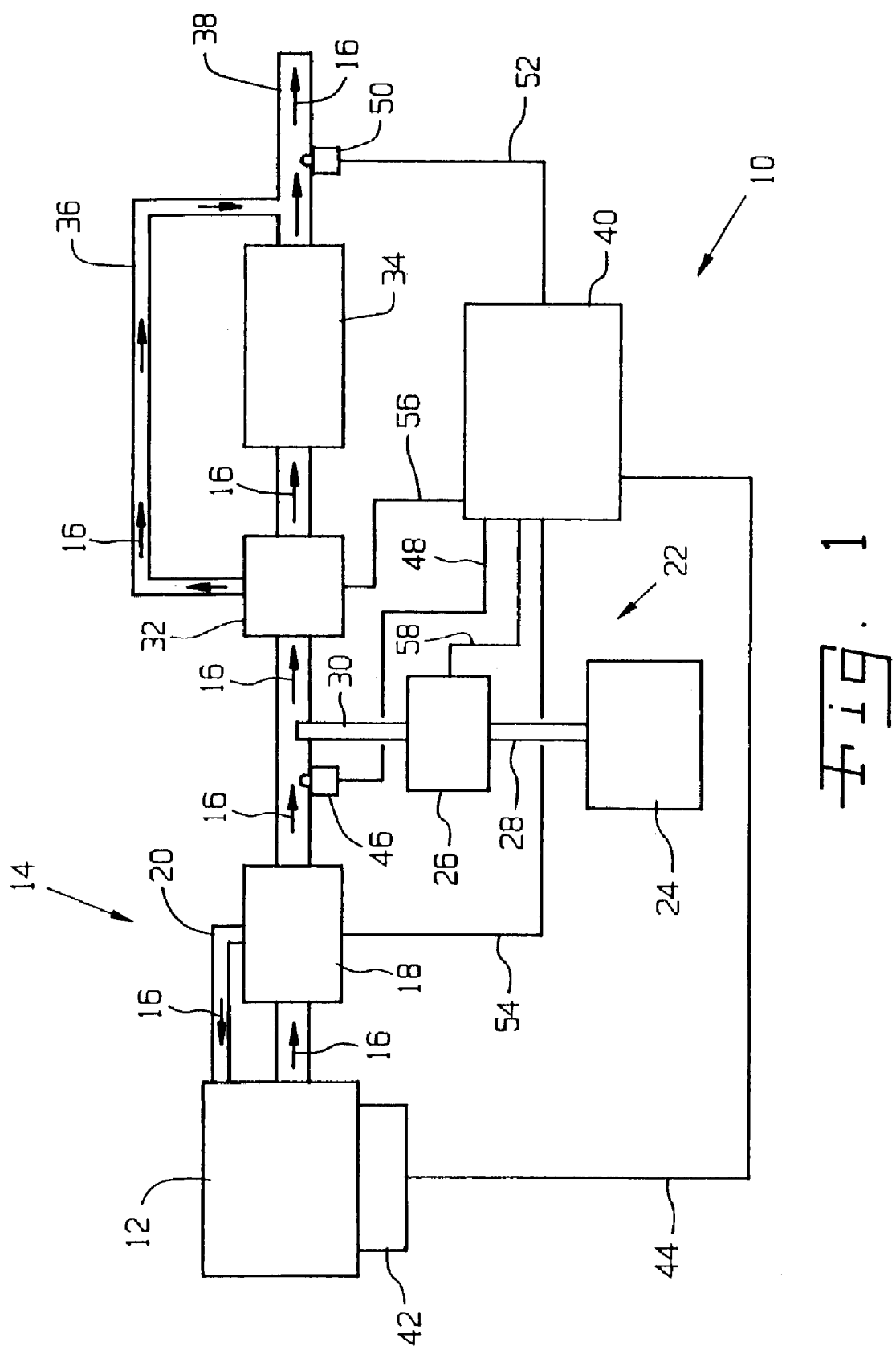
FIG. 1 is a system level block diagram of a preferred embodiment of the present invention.

Referring now to the drawings, FIG. 1 illustrates an emissions control system 10 constructed according to the present invention. The emissions control system 10 is used to control the emissions from a compression ignition engine 12, such as a diesel engine. The engine 12 includes an exhaust system 14 in which an exhaust gas stream, indicated by arrows 16, is produced. The exhaust system 14 includes one or more exhaust gas recirculation (EGR) valves 18 which are capable of being metered in order to direct all, a portion, or none of the exhaust gas stream 16 back into the engine 12 through an intake manifold 20.

The exhaust gas stream 16 is provided toward an ammonia generator system 22 which is capable of injecting a reduction agent into the exhaust gas stream 16. The system 22 includes a storage tank 24 for storing a reactant such as urea solution. The urea solution is drawn out of the tank 24 by a pump 26 through a conduit 28. Although not shown, the tank 24 may include a fill port to fill the tank 24 with the solution of urea or with any other known and suitable reactant and suitable sensors which may monitor the temperature, pressure, and amount of reactant within the tank 24. The tank 24 may further include a heating device (not shown) which may be used to heat the contents of the tank 24, if required. Again, although not shown, the system 22 may include other components such as a pressure regulator that insures that the urea solution is maintained at or below a predetermined pressure, and a valve. The urea solution is sprayed from the pump 26 through a conduit 30 with a suitable injection nozzle to introduce the urea solution into the exhaust gas stream 16.

Once the exhaust gas stream 16 passes the conduit 30 and is mixed with the urea solution, the stream 16 encounters a bypass valve 32. Depending upon various conditions which will be discussed the bypass valve 32 can direct the exhaust gas stream 16 into either an SCR catalyst 34 or a bypass pipe 36. Once the exhaust gas stream 16 leaves the SCR catalyst 34 or the bypass pipe 36 the stream 16 is provided through an outlet pipe 38 into the atmosphere.

The system 10 further includes an electronic control unit 40 which is used to control and monitor various operations and functions of the system 10 and the engine 12. The electronic control unit 40 is capable of monitoring various functions of the engine 12 by use of sensors 42 which are associated with the engine 12. The sensors 42 are connected to the electronic control unit 40 via an electrical connection 44. Examples of sensors 42 which may be employed are an engine speed sensor, an intake manifold air temperature sensor, and an intake manifold pressure sensor, all of which are not shown. A temperature sensor 46, which is positioned after the EGR valve 18, is used to determine the temperature of the exhaust gas stream 16 after the stream 16 flows from the engine 12. Alternatively, the temperature can be determined by inference from other sensed data. The sensor 46 is connected to the electronic control unit 40 by a electrical wire 48.

An NOx sensor 50 is positioned in the outlet pipe 38 of the SCR catalyst 34 and is also connected to the electronic control unit 40 by a wire 52. The NOx sensor 50 is used to provide a signal indicative of the level of NOx emissions being produced by either the SCR catalyst 34 or by the engine 12. The NOx sensor 50 is used to continually monitor the level of NOx emissions.

The electronic control unit 40 is also connected to the EGR valve 18 via a wire 54 to control operation of the valve 18. The bypass valve 32 is connected to the electronic control unit 40 by an electrical connection 56. In this manner, the electronic control unit 40 is able to control the operation of the bypass valve 32 by sending an appropriate signal over the connection 56. The electronic control unit 40 may also be connected to the pump 26 by use of a wire 58. The electronic control unit 40 is used to control the operation of the pump 26 to further control the injection of the solution of urea into the exhaust gas stream 16.

The electronic control unit 40, also known as a control module or a controller, may take many forms including a computer based system, a microprocessor based system including a microprocessor, a microcontroller, or any other control type circuit or system. The electronic control unit 40 may include memory for storage of a control program for operating and controlling the emissions control system 10 of the present invention and other memory for temporary storage of information.

The operation of the emissions control system 10 is based on the electronic control unit 40 being able to monitor the status of the engine 12 and the temperature of the exhaust gas stream 16. In particular, there are three conditions which the electronic control unit 40 must be capable of monitoring and sensing. The first condition occurs when the temperature of the exhaust gas stream 16 is below the minimum hydrolysis temperature for the solution of urea. The second condition occurs when the temperature of the exhaust gas stream 16 is above the minimum hydrolysis temperature for the solution of urea and below a temperature which corresponds to efficient NOx reduction. For example the temperature range for this second condition may be between about 160° C. and 250° C. The third condition to be monitored by the electronic control unit 40 is when the temperature of the exhaust gas stream 16 is above the temperature for efficient NOx reduction.

With these three conditions in mind, the operation of the system 10 is as follows. When the electronic control unit 40 determines that the temperature of the exhaust gas stream 16 is below the minimum hydrolysis temperature for the solution of urea, the electronic control unit 40 will operate the EGR valve 18 to meter a controlled amount of the exhaust gas stream 16 back into the engine 12. Additionally, the bypass valve 32 may be opened by the electronic control unit 40 to prevent the flow of the exhaust gas stream 16 from entering into the SCR catalyst 34. Bypassing the exhaust gas stream 16 from the catalyst 34 prevents the unburned fuel and lube oil from being depositing on any interior surface of the catalyst 34 which tends to prolong the life of the catalyst 34. Applying exhaust gas recirculation under these conditions reduces NOx formation.

When the second condition is determined by the electronic control unit 40, the second condition being that the sensed temperature of the exhaust gas stream 16 is above the temperature required for hydrolysis of the solution of urea but below the temperature for efficient reduction of NOx emissions from the catalyst 34, the electronic control unit 40 operates the EGR valve 18 to meter a controlled amount of the exhaust gas stream 16 back into the engine 12 which increases the temperature of the exhaust gas stream 16. Additionally, the electronic control unit 40 closes the bypass valve 32 to allow all of the exhaust gas stream 16 to enter into the catalyst 34. The electronic control unit 40 may also use the sensors 42 to determine, directly or by inference, the engine speed, the engine load, the intake air pressure of the engine, and the temperature of the engine to control operation of the generation system 22. The effect of the use and operation of the EGR valve 18 would be to increase the temperature of the exhaust gas stream 16 which results in a high NOx reduction efficiency. The use of EGR also reduces NOx formation from the combustion process.

The third condition corresponds to the temperature of the exhaust gas stream 16 being high enough for efficient NOx reduction without the aid of the EGR valve 18. During this condition the electronic control unit 40 would close the EGR valve 18 to direct all of the exhaust gas stream 16 toward the SCR catalyst 34. Additionally, the bypass valve 32 would be closed to allow all of the exhaust gas stream 16 to flow into the catalyst 34. This would provide for the highest NOx reduction efficiency. It is also contemplated that EGR valve 18 can be open during the third condition, to meter a controlled amount of exhaust gas stream 16 back to engine 12, for reducing NOx formation in the combustion process.

Although the system 10 was described using the bypass valve 32, it is possible and contemplated that the system 10 could function without the bypass valve 32. For example, if the bypass valve 32 was not part of the system 10, the exhaust gas stream 16 would be able to always pass through the SCR catalyst 34. The tradeoff of this configuration or construction is that it would allow matter to enter into the catalyst 34 which may clog the interior of the catalyst 34 at the expense of not allowing untreated NOx being emitted into the atmosphere.

Figure 2:
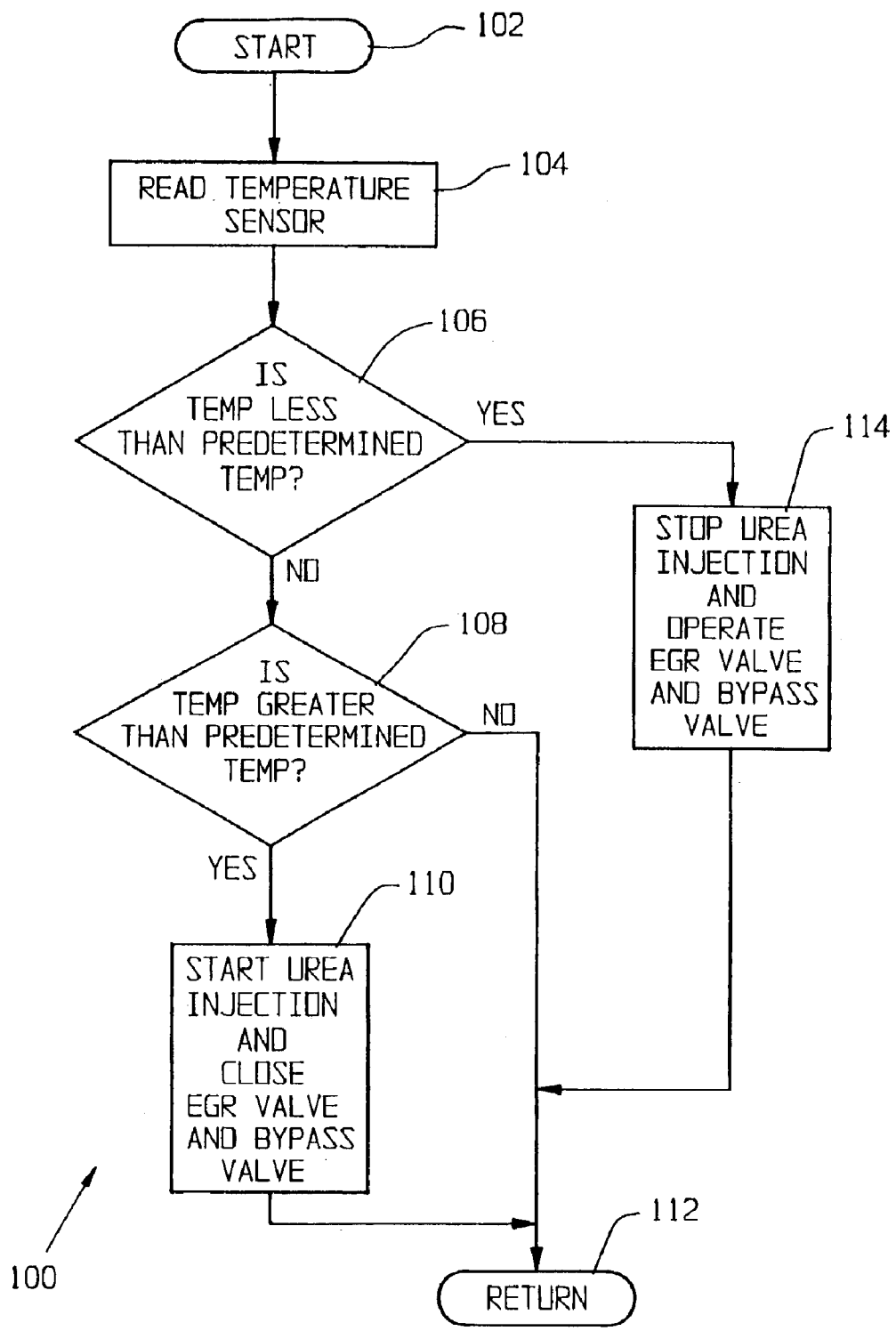
FIG. 2 is a flowchart of the software control employed in connection with a preferred embodiment of the present invention.

Referring now to FIG. 2, a flowchart or program 100 of the software stored in the electronic control unit 40 and implemented in a preferred embodiment of the present invention is shown. Those skilled in the art can easily and readily develop the specific software code necessary to implement the flowchart or program 100 by using the specific instructions set associated with the microprocessor or microcontroller selected for use with the electronic control unit 40 of the present invention.

The program 100 begins at a step 102 in which the program 100 starts or begins operation. The program then continues to a step 104 in which the temperature sensor 46 is read to determine the temperature of the exhaust gas stream 16. Once the temperature is determined, the program 100 continues to a step 106 to decide whether the temperature of the exhaust gas stream 16 is less than a predetermined temperature. For example, the predetermined temperature may be the temperature at which the solution of urea will undergo the hydrolysis process. If, in the step 106, it is determined that the temperature is not less than the predetermined temperature, control of the program continues on to a step 108. In the step 108 another decision is made as to whether the temperature of the exhaust gas stream 16 is greater than the predetermined temperature. When it is determined that the sensed temperature is greater than the predetermined temperature the program 100 moves to a next step 110. In the step 110 the electronic control unit 40 starts urea solution injection and closes the EGR valve 18 and the bypass valve 32. This allows the exhaust gas stream 16 to enter into the SCR catalyst 34. After the valves 18 and 32 are closed the program 100 ends at a return step 112.

If in the step 106 it is determined that the sensed temperature is less than the predetermined temperature, then the program 100 will branch to a step 114. In the step 114 the electronic control unit 40 will stop urea solution injection and operate the EGR valve 18 and the bypass valve 32 to prevent the exhaust gas stream 16 from entering into the SCR catalyst 34. Once the valves 18 and 32 are opened, the control of the program 100 will pass to the step 112. Additionally, if in the step 108, for some reason it is determined that the temperature is not greater than the predetermined temperature, the program 100 will branch to the step 112.

INDUSTRIAL APPLICABILITY

It is more expensive to run a compression ignition engine with an SCR catalyst system than it is to run a compression ignition engine without such a system. Due to this increased cost, it is important to operate the SCR catalyst system as efficiently as possible, and to prolong the life of the SCR catalyst. It is possible, under some conditions, to circumvent or bypass the SCR system to reduce operating costs and prolong the life of the SCR catalyst, but at the expense of increased exhaust emissions.

An embodiment of the present invention monitors various operations of emissions control system using 10 sensors such as temperature sensor 46, and/or NOx sensor 50. The operating conditions of compression ignition engine 12 are sensed using sensors 42. Data regarding sensed conditions from emissions control system 10 and engine 12 are supplied to electronic control unit 40, to determine if the SCR reaction or process is being completed as efficiently as possible, and to control operations of various system components in response thereto. The present invention can be used to ensure that the exhaust gas stream is at sufficient temperature to effectively complete the SCR reaction. Additionally, optional bypass valve 32 and bypass pipe 36 can be used to circumvent SCR catalyst 34 when conditions are such that use of the system would be ineffective in reducing emissions, or when use of the system could be detrimental to the system. By using an embodiment of the present invention, NOx emissions are reduced in an efficient manner, when using an SCR system in conjunction with a solution of urea as the reactant.

What is claimed is:

1. An emissions control system for a compression ignition engine capable of producing an exhaust gas stream to be treated by a reduction agent which is mixed with the exhaust gas stream to convert the exhaust gas stream prior to being directed into an SCR catalyst capable of reducing NOx in the exhaust gas stream, the system comprising:
   a sensor for determining the temperature of the exhaust gas stream prior to being mixed with the reduction agent;
   an exhaust gas recirculation valve associated with the compression ignition engine for directing the exhaust gas stream back into the compression ignition engine;
   a bypass valve associated with the compression ignition engine for directing the exhaust gas stream past the SCR catalyst; and
   an electronic control unit connected to the sensor, the bypass valve and the exhaust gas recirculation valve for determining whether the temperature of the exhaust gas stream is at a predetermined temperature and if so for controlling operation of the valve to allow a portion of the exhaust gas stream to be directed into the SCR catalyst, and if the temperature is below the predetermined temperature for controlling operation of the valves to direct all of the exhaust gas stream to avoid the SCR catalyst.

2. The system of claim 1 wherein the electronic control unit is capable of determining whether the temperature of the exhaust gas stream is above the predetermined temperature for controlling operation of the valves to allow all of the exhaust gas stream to be directed into the SCR catalyst.

3. The system of claim 1 further comprising a sensor associated with the compression ignition engine for sensing an operation of the engine, the sensor being connected to the electronic control unit and the electronic control unit for determining whether the sensed operation is within an acceptable limit and if not for controlling operation of the valves to direct a suitable amount of the exhaust gas stream back into the engine.

4. The system of claim 1 further comprising a sensor associated with an outlet of the SCR catalyst for sensing the level of NOx emissions emitted by the SCR catalyst, the sensor being connected to the electronic control unit for determining whether the level of NOx emissions is at an acceptable level.

5. The system of claim 1 wherein the electronic control unit is capable of determining whether the temperature of the exhaust gas stream is within a predetermined temperature range and when it is determined that the temperature is within the range for controlling operation of the valves to allow all of the portion of the exhaust gas stream to be directed into the SCR catalyst.

6. The system of claim 1 further comprising a tank for storing the reduction agent and a pump connected to the tank for drawing the agent from the tank to be injected into the exhaust gas stream, the pump further being connected to the electronic control unit with the unit being capable of controlling operation of the pump.

7. An emissions control system for a compression ignition engine capable of producing an exhaust gas stream to be treated by a reduction agent which is mixed with the exhaust gas stream to convert the exhaust gas stream prior to being directed into an SCR catalyst capable of reducing NOx emissions in the exhaust gas stream, the system comprising:
   a sensor for determining the temperature of the exhaust gas stream prior to being mixed with the reduction agent;
   an exhaust gas recirculation valve associated with the compression ignition engine for directing the exhaust gas stream back into the compression ignition engine;
   a bypass valve associated with the exhaust gas stream and positioned prior to an input of the SCR catalyst, the bypass valve being operated to selectively provide the exhaust gas stream to the input of the SCR catalyst and to bypass the SCR catalyst
   an electronic control unit connected to the temperature sensor, the exhaust gas recirculation valve, and the bypass valve for determining whether the temperature of the exhaust gas stream is at a predetermined temperature and if so for controlling operation of the exhaust gas recirculation valve to allow a portion of the exhaust gas stream to be directed to the bypass valve and for controlling operation of the bypass valve to either direct the exhaust gas stream which reaches the bypass valve selectively and alternatively into the SCR catalyst and to bypass the SCR catalyst; and
   wherein the electronic control unit is capable of determining whether the temperature of the exhaust gas stream is below the predetermined temperature and if so for controlling operation of the valve to direct all of the exhaust gas stream to bypass the SCR catalyst.

8. The system of claim 7 further comprising a sensor associated with the compression ignition engine for sensing an operation of the engine, the sensor being connected to the electronic control unit and the electronic control unit for determining whether the sensed operation is within an acceptable limit and if not for controlling operation of the exhaust gas recirculation valve to direct a suitable amount of the exhaust gas stream back into the engine.

9. The system of claim 7 further comprising a sensor associated with an outlet of the SCR catalyst and an outlet of the bypass valve for sensing the level of NOx emissions emitted by the SCR catalyst or the bypass valve, the sensor being connected to the electronic control unit for determining whether the level of NOx emissions is at an acceptable level.

10. The system of claim 7 wherein the electronic control unit is capable of determining whether the temperature of the exhaust gas stream is within a predetermined temperature range and when it is determined that the temperature is within the range for controlling operation of the exhaust gas recirculation valve to allow a portion of the exhaust gas stream to be directed to the bypass valve.

11. The system of claim 10 wherein the electronic control unit further controls operation of the bypass valve to provide the portion of the exhaust gas stream into the SCR catalyst.

12. The system of claim 7 further comprising a tank for storing the reduction agent and a pump connected to the tank for drawing the agent from the tank to be injected into the exhaust gas stream, the pump further being connected to the electronic control unit with the unit being capable of controlling operation of the pump.

13. An emissions control system for a compression ignition engine capable of producing an exhaust gas stream to be treated by a reduction agent which is mixed with the exhaust gas stream to convert the exhaust gas stream prior to being directed into an SCR catalyst capable of reducing NOx emissions in the exhaust gas stream, the system comprising:

a sensor for determining the temperature of the exhaust gas stream prior to being mixed with the reduction agent;

an exhaust gas recirculation valve associated with the compression ignition engine for directing the exhaust gas stream back into the compression ignition engine;

a bypass valve associated with the exhaust gas stream and positioned prior to an input of the SCR catalyst, the bypass valve being operated to selectively provide the exhaust gas stream to the input of the SCR catalyst and to bypass the SCR catalyst an electronic control unit connected to the temperature sensor, the exhaust gas recirculation valve, and the bypass valve for determining whether the temperature of the exhaust gas stream is at a predetermined temperature and if so for controlling operation of the exhaust gas recirculation valve to allow a portion of the exhaust gas stream to be directed to the bypass valve and for controlling operation of the bypass valve to either direct the exhaust gas stream which reaches the bypass valve selectively and alternatively into the SCR catalyst and to bypass the SCR catalyst; and wherein the electronic control unit is capable of determining whether the temperature of the exhaust gas stream is above the predetermined temperature to control operation of the exhaust gas recirculation valve to allow all of the exhaust gas stream to be directed to the bypass valve and to control operation of the bypass valve to allow the exhaust gas stream to be directed into the SCR catalyst.

* * * * *